(12) United States Patent
Kothari

(10) Patent No.: US 12,535,507 B2
(45) Date of Patent: Jan. 27, 2026

(54) SYSTEMS, METHODS, AND APPARATUSES FOR NON-CONTACT VOLTAGE DETECTION

(71) Applicant: HONEYWELL SAFETY PRODUCTS USA, INC., Charlotte, NC (US)

(72) Inventor: Sanjay Kothari, Charlotte, NC (US)

(73) Assignee: Honeywell Safety Products USA, Inc., Latham, NY (US)

( * ) Notice: Subject to any disclaimer, the term of this patent is extended or adjusted under 35 U.S.C. 154(b) by 168 days.

(21) Appl. No.: 18/464,819

(22) Filed: Sep. 11, 2023

(65) Prior Publication Data

US 2024/0103044 A1     Mar. 28, 2024

(30) Foreign Application Priority Data

Sep. 26, 2022  (IN) .............................. 202211055081

(51) Int. Cl.
 *G01R 15/16* (2006.01)
 *C07C 25/18* (2006.01)
 (Continued)

(52) U.S. Cl.
 CPC ............ *G01R 15/16* (2013.01); *C07C 209/42* (2013.01); *C07C 233/91* (2013.01); *C07C 25/18* (2013.01)

(58) Field of Classification Search
 CPC ..... G01R 15/16; C07C 209/42; C07C 233/91; C07C 25/18
 (Continued)

(56) References Cited

U.S. PATENT DOCUMENTS 7,911,264 B2   3/2011  Hallak
11,209,480 B2  12/2021  Steuer et al.
(Continued)

FOREIGN PATENT DOCUMENTS

CN     113311214 A    8/2021
EP       3567380 A1   11/2019
WO   2017/168608 A1   10/2017

OTHER PUBLICATIONS

Mir Majid Teymoori et al., "A Tunable Capacitor Based on MEMS Technology for RF Applications," Engineering, Technology & Applied Science Research, 6(3):982-986, (Jun. 2016).
(Continued)

*Primary Examiner* — Raul J Rios Russo
(74) *Attorney, Agent, or Firm* — Fredrikson & Byron, P.A.

(57) ABSTRACT

An example non-contact voltage detector may include a sensor plate. In the presence of a source voltage associated with a voltage source a current is induced in the sensor plate. The non-contact voltage detector may include a fixed frequency resonator proximate the sensor plate and having a pair of plates each configured to oscillate. The non-contact voltage detector may include a current to voltage converter connected with the sensor plate and configured to convert the current induced in the sensor plate into a voltage. The non-contact voltage detector may include an analog to digital converter connected with the current to voltage converter configured to convert the voltage into a digital signal. The non-contact voltage detector may include a controller connected with the analog to digital converter and configured to receive the digital signal from the analog to digital converter and detect the source voltage.

20 Claims, 5 Drawing Sheets

(51) Int. Cl.
*C07C 209/42* (2006.01)
*C07C 233/91* (2006.01)

(58) Field of Classification Search
USPC .......................................................... 324/126
See application file for complete search history.

(56) References Cited

U.S. PATENT DOCUMENTS

| | | |
|---|---|---|
| 2016/0109486 A1 | 4/2016 | Yanagisawa |
| 2017/0082664 A1 | 3/2017 | Yamada |
| 2018/0136257 A1* | 5/2018 | Steuer .................... G01R 15/14 |
| 2018/0136259 A1* | 5/2018 | Epperson ................ G01R 19/00 |
| 2018/0136264 A1* | 5/2018 | Steuer ...................... G01R 1/22 |
| 2019/0346493 A1* | 11/2019 | Steuer ...................... G01R 1/22 |
| 2021/0318357 A1* | 10/2021 | Parker ................... G01R 15/16 |
| 2022/0050129 A1 | 2/2022 | Morris et al. |
| 2022/0178971 A1* | 6/2022 | Dutta .................. G01R 15/142 |

OTHER PUBLICATIONS

Extended European Search Report Mailed on Feb. 2, 2024 for EP Application No. 23192589, 11 page(s).
Communication about intention to grant a European patent Mailed on Feb. 3, 2025 for EP Application No. 23192589, 6 page(s).

* cited by examiner

SYSTEMS, METHODS, AND APPARATUSES FOR NON-CONTACT VOLTAGE DETECTION

CROSS-REFERENCES TO RELATED APPLICATIONS

This application claims priority pursuant to 35 U.S.C. 119(a) to Indian Application No. 202211055081, filed Sep. 26, 2022, which application is incorporated herein by reference in its entirety.

TECHNOLOGICAL FIELD

Embodiments of the present disclosure relate generally to systems, methods, apparatuses for non-contact voltage detection.

BACKGROUND

Applicant has identified many technical challenges and difficulties associated with systems, apparatuses, and methods for non-contact voltage detection. Through applied effort, ingenuity, and innovation, Applicant has solved problems related to systems, apparatuses, and methods for non-contact voltage detection by developing solutions embodied in the present disclosure, which are described in detail below.

BRIEF SUMMARY

Various embodiments described herein relate to systems, apparatuses, and methods for non-contact voltage detection.

In accordance with one aspect of the disclosure, a non-contact voltage detector is provided. In some embodiments, the non-contact voltage detector includes a sensor plate. In this regard, in the presence of a source voltage associated with the voltage source a current is induced in the sensor plate. In some embodiments, the non-contact voltage detector includes a fixed frequency resonator proximate the sensor plate and comprising a pair of plates each configured to oscillate. In some embodiments, the non-contact voltage detector further includes a current to voltage converter connected with the sensor plate and configured to convert the current induced in the sensor plate into a voltage. In some embodiments, the non-contact voltage detector further includes an analog to digital converter connected with the current to voltage converter configured to convert the voltage into a digital signal. In some embodiments, the non-contact voltage detector further includes a controller connected with the analog to digital converter and configured to receive the digital signal from the analog to digital converter and, in response to receiving the digital signal from the analog to digital converter, detect the source voltage.

In some embodiments, in response to the controller detecting the source voltage, the controller is configured to trigger an alarm.

In some embodiments, the controller detects the source voltage when the source voltage is greater than a sensitivity.

In some embodiments, the sensor plate and the fixed frequency resonator are separated by a first distance.

In some embodiments, the sensitivity is inversely proportional to the first distance.

In some embodiments, the fixed frequency resonator is associated with a resonator frequency and wherein each of the pair of plates are configured to oscillate at the resonator frequency.

In some embodiments, the source voltage comprises DC voltage.

In some embodiments, the source voltage comprises DC voltage and AC voltage.

In some embodiments, the controller is further configured to perform a Fast Fourier Transform to determine a first component set and a second component set.

In some embodiments, the pair of plates are configured to oscillate between a first position in which the pair of plates contact each other and a second position in which the pair of plates are separated by a second distance.

In accordance with another aspect of the disclosure, a non-contact voltage detection method is provided herein. In some embodiments, the non-contact voltage detection method includes oscillating each of a pair of plates of a fixed frequency resonator. In this regard, the fixed frequency resonator may be proximate a sensor plate. In this regard, in the presence of the source voltage associated with the voltage source a current is induced in the sensor plate. In some embodiments, the non-contact voltage detection method further includes converting the current into a voltage using a current to voltage converter. In some embodiments, the non-contact voltage detection method further includes converting the voltage into a digital signal using an analog to digital converter. In some embodiments, the non-contact voltage detection method further includes receiving the digital signal from the analog to digital converter. In some embodiments, the non-contact voltage detection method further includes detecting the source voltage.

In some embodiments, the non-contact voltage detection method further includes triggering an alarm in response to detecting the source voltage.

In some embodiments, the source voltage is detected when the source voltage is greater than a sensitivity.

In some embodiments, the sensor plate and the fixed frequency resonator are separated by a first distance.

In some embodiments, the sensitivity is inversely proportional to the first distance.

In some embodiments, the fixed frequency resonator is associated with a resonator frequency and wherein each of the pair of plates are configured to oscillate at the resonator frequency.

In some embodiments, the source voltage comprises DC voltage.

In some embodiments, the source voltage comprises DC voltage and AC voltage.

In some embodiments, the non-contact voltage detection method further includes performing a Fast Fourier Transform to determine a first component set and a second component set.

In some embodiments, the pair of plates are configured to oscillate between a first position in which the pair of plates contact each other and a second position in which the pair of plates are separated by a second distance.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
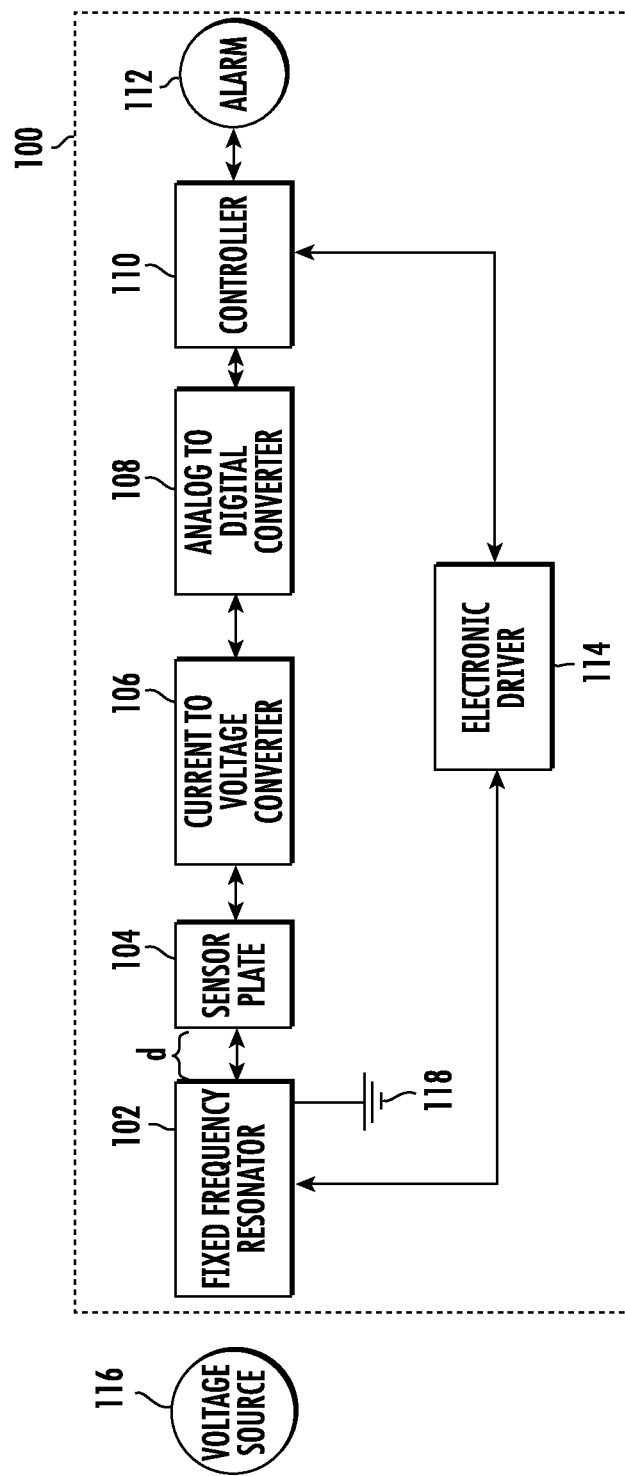
FIG. 1 illustrates an example non-contact voltage detector in accordance with one or more embodiments of the present disclosure.

Example embodiments will be described more fully hereinafter with reference to the accompanying drawings, in which some, but not all embodiments of disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

Example embodiments disclosed herein address technical problems associated with non-contact voltage detection. As would be understood by one skilled in the field to which this disclosure pertains, there are numerous example scenarios in which a user may need to use non-contact voltage detection.

In many applications, it is often necessary to perform non-contact voltage detection. For example, non-contact voltage detection can help ensure safety in electronic applications that use high voltage (e.g., electric cars, transformers, industrial equipment, etc.). As another example, non-contact voltage detection can improve efficiency and reduce costs in applications in which it is difficult to directly make contact with a voltage source and/or applications that include sensitive electronic circuits that may be damaged through contact.

In general, non-contact voltage detection of alternating current (AC) voltage sources can be accomplished. For example, non-contact voltage detection of AC voltage sources can be performed by first approaching the AC voltage source with a copper plate. Once the copper plate is at a fixed distance from the AC voltage source, a capacitor is formed by the AC voltage source and the copper plate. An AC current can be generated by the capacitor and, since the distance between the copper plate and the AC voltage source is fixed (e.g., the capacitor's capacitance is fixed) and the source voltage is an AC voltage, the capacitor will not become fully charged. The AC current can then be analyzed to detect and measure the AC voltage source. However, the same approach does not work for detecting a DC voltage source because the distance between the copper plate and the DC voltage source is fixed (e.g., the capacitor's capacitance is fixed) and the source voltage is a DC voltage and, as a result, the capacitor will become fully charged. Thus, in some examples, although the capacitor formed by the DC voltage source and the copper plate may create a DC current, the DC current only exists for a short period of time (e.g., a few nano seconds) until the capacitor is fully charged. As a result, due to the short period of time that the DC current exists, it is very difficult, if not impossible in some examples, to detect the DC voltage source using the foregoing approach.

Example solutions for non-contact voltage detection of a DC voltage source include, for example, a rotating vane electric field mill technique. However, the rotating vane electric field mill technique has several disadvantages, including introduction of noise, creation of numerous frequency components, and/or need of a motor. As a result, the rotating vane electric field mill technique results in less accurate detection of DC voltage (e.g., through the introduction of noise and the creation of numerous frequency components) and requires, in some examples, increased construction and operating costs (e.g., due to the need of a motor).

Thus, to address these and/or other issues related to non-contact voltage detection, example systems, apparatuses, and/or methods for non-contact voltage detection are disclosed herein. For example, embodiments in this disclosure, described in greater detail below, include a sensor plate in which in the presence of a source voltage associated with a voltage source a current is induced in the sensor plate. In some examples, a fixed frequency resonator may be positioned proximate the sensor plate and include a pair of plates that are each configured to oscillate. In some examples, the oscillation of the pair of plates of the fixed frequency resonator may cause the capacitance of a capacitor formed by the source voltage associated with the voltage source and the sensor plate to vary. As a result, in some examples, the current induced in the sensor plate may be an AC current even if the source voltage associated with the voltage source is or otherwise includes a DC voltage. In some embodiments, in this disclosure and as described in greater detail below, the current induced in the sensor plate may be converted into a voltage and the voltage may then be converted into a digital signal. In some examples, the digital signal may be analyzed by a controller to detect the presence of a DC voltage associated with the voltage source and also determine (e.g., measure) the DC voltage associated with the voltage source. Accordingly, embodiments herein provide for the non-contact detection and measurement of a DC voltage associated with a voltage source, in some examples, without the inaccuracies and costs associated with other means of non-contact voltage detection.

Example Non-Contact Voltage Detector

Figure 2:
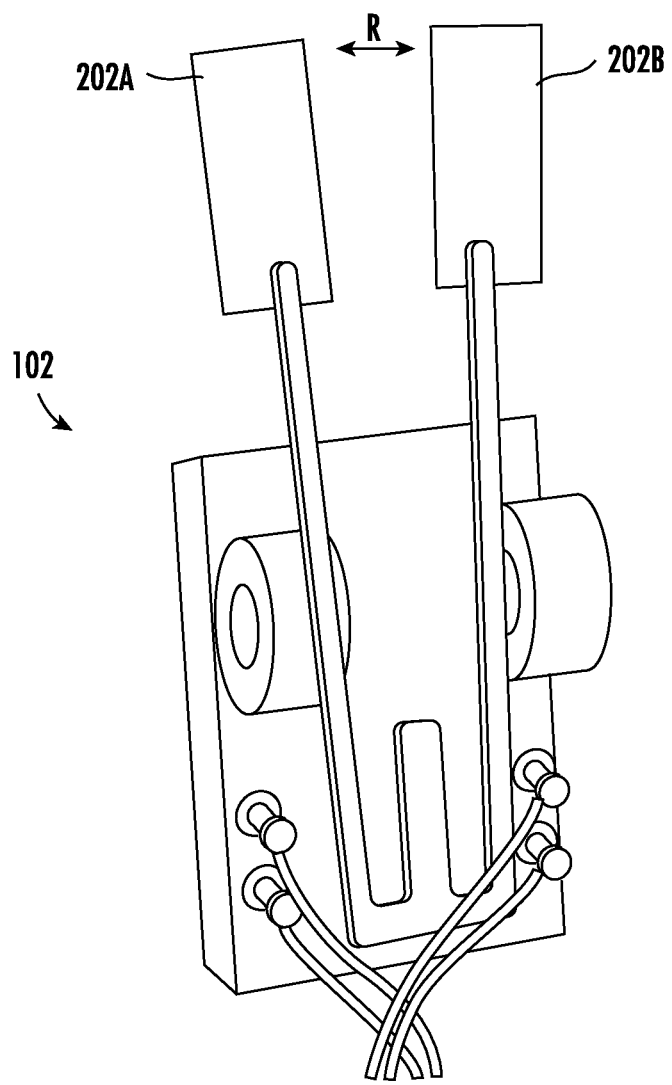
FIG. 2 illustrates an example fixed frequency resonator in accordance with one or more embodiments of the present disclosure.

With reference to FIG. 1 and FIG. 2, embodiments herein provide for an example non-contact voltage detector 100. In some embodiments, the non-contact voltage detector 100 may be configured to detect a source voltage associated with a voltage source 116 and/or measure the source voltage associated with the voltage source 116. In some embodiments, the non-contact voltage detector 100 may be configured to detect the source voltage without making contact with the voltage source 116. That is, the non-contact voltage detector 100 may be capable of detecting the source voltage associated with the voltage source 116 without making a galvanic connection to the voltage source 116. In some embodiments, the source voltage associated with the voltage source 116 may be alternating current (AC) voltage and/or direct current (DC) voltage.

In some embodiments, the non-contact voltage detector 100 may include a sensor plate 104. The sensor plate 104 may comprise any electrically conductive material. For example, the sensor plate 104 may comprise copper, aluminum, steel, iron, gold, silver, and/or graphite. The sensor plate 104 may be positioned proximate the source voltage associated with the voltage source 116 when the non-contact voltage detector 100 is being used to detect the source voltage associated with a voltage source 116 and/or measure the source voltage associated with the voltage source 116. In this regard, the source voltage associated with the voltage source 116 and the sensor plate 104 may be at least partially separated by an insulator (e.g., ambient air) Accordingly, when the non-contact voltage detector 100 is being used to detect the source voltage associated with a voltage source 116 and/or measure the source voltage associated with the voltage source 116, a capacitor is formed by the source voltage associated with the voltage source 116 and the sensor plate 104. For example, the source voltage associated with the voltage source 116 and the sensor plate 104 may each form one side of the capacitor.

In some embodiments, the non-contact voltage detector 100 may include a fixed frequency resonator 102. The fixed frequency resonator 102 may be an electromechanical resonator. The fixed frequency resonator 102 may be proximate the sensor plate and, when the non-contact voltage detector 100 is being used to detect the source voltage associated with a voltage source 116 and/or measure the source voltage associated with the voltage source 116, proximate the source voltage associated with the voltage source 116 (e.g., between the source voltage associated with the voltage source 116 and the sensor plate 104 there may be an insulator (e.g., ambient air) and/or the fixed frequency resonator 102). In some embodiments, the sensor plate 104 and the fixed frequency resonator 102 may be separated by a distance d.

In some embodiments, the fixed frequency resonator 102 may include a pair of plates 202A and 202B. Each of the pair of plates 202A and 202B may comprise any electrically conductive material. For example, each of the pair of plates 202A and 202B may comprise copper, aluminum, steel, iron, gold, silver, and/or graphite. In some embodiments, the fixed frequency resonator 102 and/or each of the pair of plates 202A and 202B may be connected to ground 118 in order to increase the noise immunity of the fixed frequency resonator 102.

In some embodiments, the pair of plates 202A and 202B may be configured to oscillate. In some embodiments, as the pair of plates 202A and 202B oscillate, a distance R between the pair of plates 202A and 202B may vary. In some embodiments, the pair of plates 202A and 202B may oscillate between a first position and a second position. The distance R between the pair of plates 202A and 202B may be smallest when the pair of plates 202A and 202B are in the first position. The distance R between the pair of plates 202A and 202B may be largest when the pair of plates 202A and 202B are in the second position. In some embodiments, in the first position the pair of plates 202A and 202B of plates may be in contact with each other (e.g., the distance R is zero).

In some embodiments, the pair of plates 202A and 202B may be configured to oscillate at a resonator frequency $F_r$. As such, the distance R may vary in accordance with the resonator frequency $F_r$. For example, the distance R between the pair of plates 202A and 202B at the peak of the resonator frequency $F_r$ may be greater than at the trough of the resonator frequency $F_r$ or vice versa. As an example, the pair of plates 202A and 202B may be separated by 10 mm-20 mm at the peak of the resonator frequency $F_r$ and 2 mm-4 mm at the trough of the resonator frequency $F_r$.

In some embodiments, as the pair of plates 202A and 202B oscillate and the distance R between the pair of plates 202A and 202B varies, the fixed frequency resonator 102 may cause the capacitance of the capacitor formed by the source voltage associated with the voltage source 116 and the sensor plate 104 to vary. For example, as the distance R between the pair of plates 202A and 202B increases, the capacitance of the capacitor formed by the source voltage associated with the voltage source 116 and the sensor plate 104 may increase, while as the distance between the pair of plates 202A and 202B decreases, the capacitance of the capacitor formed by the source voltage associated with the voltage source 116 and the sensor plate 104 may decrease.

In some embodiments, when the non-contact voltage detector 100 is in the presence of the source voltage associated with the voltage source 116 (e.g., when the fixed frequency resonator 102 and/or the sensor plate 104 are proximate the voltage source 116) a current may be induced in the sensor plate 104. In some embodiments, the source voltage associated with the voltage source 116 may induce the current in the sensor plate 104. In some embodiments, the greater the source voltage associated with the voltage source 116, the greater the current that will be induced in the sensor plate 104. For example, a source voltage of 240V will induce a greater current in the sensor plate 104 than a source voltage of 120V. The current induced in the sensor plate 104 may be an AC current. In this regard, the current induced in the sensor plate 104 may be an AC current if the source voltage associated with the voltage source 116 includes a DC voltage, an AC voltage, or both a DC voltage and an AC voltage. Said differently, since the capacitance of the capacitor formed by the source voltage associated with the voltage source 116 and the sensor plate 104 varies as the pair of plates 202A and 202B oscillate, the current induced in the sensor plate 104 by the source voltage associated with the voltage source 116 will also vary. In other words, the fixed frequency resonator 102 is configured to modulate the capacitance of the capacitor formed by the source voltage associated with the voltage source 116 and the sensor plate 104 resulting in an AC current being induced in the sensor plate 104.

In some embodiments, the non-contact voltage detector 100 may be associated with a sensitivity. In some embodiments, the sensitivity of the non-contact voltage detector 100 may indicate a threshold at which the non-contact voltage detector 100 may detect the source voltage associated with the voltage source 116. For example, if the non-contact voltage detector 100 has a sensitivity of 120 Volts (V), the non-contact voltage detector 100 will detect the source voltage associated with the voltage source 116, if the source voltage is at least 120V. In this regard, if the source voltage associated with the voltage source 116 is greater than the sensitivity of the non-contact voltage detector 100, the current will be induced in the sensor plate 104. Additionally, if the source voltage associated with the voltage source 116 is less than the sensitivity of the non-contact voltage detector 100, the current will not be induced in the sensor plate 104.

In some embodiments, the sensitivity of the non-contact voltage detector 100 may be set by adjusting the distance d between the sensor plate 104 and the fixed frequency resonator 102. The distance d may be inversely proportional to the sensitivity of the non-contact voltage detector 100. In this regard, the sensitivity of the non-contact voltage detector 100 may be increased by reducing the distance d and decreased by increasing the distance d. For example, if the non-contact voltage detector 100 has a sensitivity of 120V, the distance d may be less than if the non-contact voltage detector 100 has a sensitivity of 240V.

In some embodiments, the sensitivity of the non-contact voltage detector 100 may be set by adjusting a size of each of the pair of plates 202A and 202B. The size of each of the pair of plates 202A and 202B may be proportional to the sensitivity of the non-contact voltage detector 100. In this regard, the sensitivity of the non-contact voltage detector 100 may be increased by increasing the size of each of the pair of plates 202A and 202B and decreased by decreasing the size of each of the pair of plates 202A and 202B. For example, if the non-contact voltage detector 100 has a sensitivity of 120V, the size of the pair of plates 202A and 202B may be greater than if the non-contact voltage detector 100 has a sensitivity of 240V.

In some embodiments, the sensitivity of the non-contact voltage detector 100 may be set by adjusting the resonator frequency $F_r$ at which the pair of plates 202A and 202B may be configured to oscillate. The resonator frequency $F_r$ may be proportional to the sensitivity of the non-contact voltage detector 100. In this regard, the sensitivity of the non-contact voltage detector 100 may be increased by increasing the resonator frequency $F_r$ and decreased by decreasing the resonator frequency $F_r$. For example, if the non-contact voltage detector 100 has a sensitivity of 120V, the resonator frequency $F_r$ may be greater than if the non-contact voltage detector 100 has a sensitivity of 240V.

In some embodiments, the non-contact voltage detector 100 may include a current to voltage converter 106 connected to the sensor plate 104. The current to voltage converter 106 may be configured to convert the current induced in the sensor plate 104 into a voltage. In some embodiments, the voltage may be an AC voltage. The current to voltage converter 106 may comprise any electronic circuit capable of converting a current into a voltage. For example, the current to voltage converter 106 may be a transimpedance filter.

In some embodiments, the non-contact voltage detector 100 may include an analog to digital converter (ADC) 108 connected to the current to voltage converter 106. The ADC 108 may be configured to convert the voltage into a digital signal. The ADC 108 may be any electronic circuit capable of converting the voltage into a digital signal. For example, the ADC 108 may be a direct-conversion ADC, a successive approximation ADC, a ramp-compare ADC, a Wilkinson ADC, an integrating ADC, a delta-encoded ADC, a pipelined ADC, a sigma-delta ADC, a time-interleaved ADC, an intermediate FM ADC, and/or a time-stretch ADC. Although in the non-contact voltage detector 100 depicted in FIG. 1 the ADC 108 is depicted as a separate component of the non-contact voltage detector 100, it would be understood by one skilled in the field to which this disclosure pertains, that, in some embodiments, the ADC 108 may be embodied within the controller 110.

In some embodiments, the non-contact voltage detector 100 may include a controller 110. The controller 110 may be configured to receive the digital signal from the ADC 108. In some embodiments, the controller 110 may be configured to detect the source voltage associated with the voltage source 116 by receiving the digital signal from the ADC 108. That is, if the controller 110 receives the digital signal from the ADC 108, the controller 110 detects the source voltage associated with the voltage source 116. Said differently, because the sensitivity of the non-contact voltage detector 100 may be set such that, if the source voltage associated with the voltage source 116 is less than the sensitivity of the non-contact voltage detector 100, no current will be induced in the sensor plate 104 and, as a result, the controller 110 will not receive the digital signal from the ADC 108 (e.g., via the current to voltage converter 106). Similarly, because the sensitivity of the non-contact voltage detector may be set such that, if the source voltage associated with the voltage source 116 is equal to or greater than the sensitivity of the non-contact voltage detector 100, the current will be induced in the sensor plate 104 and, as a result, the controller 110 will receive the digital signal from the ADC 108 (e.g., via the current to voltage converter 106).

In some embodiments, the controller 110 may be configured to measure the source voltage associated with the voltage source 116 based on the digital signal received from the ADC 108. For example, the controller 110 may be able to measure a DC voltage associated with the voltage source 116, an AC voltage the voltage source 116, and/or a DC and an AC voltage the voltage source 116. In this regard, the controller 110 may be configured to perform a Fast Fourier Transform (FFT) on the digital signal received from the ADC 108.

In some embodiments, by performing a FFT on the digital signal, the controller 110 may be able to determine a first component set and, when the voltage associated with the voltage source 116 includes an AC voltage, a second component set (e.g., the first component set and the second component set including components in the frequency domain). In some embodiments, the first component set may include a component associated with the resonator frequency $F_r$ associated with the fixed frequency resonator 102. In some embodiments, the controller 110 may be configured to determine (e.g., measure) a DC voltage associated with the voltage source 116 based on the component associated with the resonator frequency $F_r$ associated with the fixed frequency resonator 102. For example, the controller 110 may be configured to determine the amplitude of the DC voltage associated with the voltage source 116 using the component associated with the resonator frequency $F_r$ associated with the fixed frequency resonator 102. In some embodiments, the second component set may include a component associated with the resonator frequency $F_r$ associated with the fixed frequency resonator 102 and components (e.g., $F_r+f$ and $F_r-f$) associated with a frequency f associated with the voltage source 116 (e.g., the frequency of an AC voltage associated with the voltage source 116). In some embodiments, the controller 110 may be configured to determine (e.g., measure) an AC voltage associated with the voltage source 116 based on the components (e.g., $F_r+f$ and $F_r-f$) associated with a frequency f associated with the voltage source 116. For example, the controller 110 may be configured to determine (e.g., measure) an AC voltage associated with the voltage source 116 because the sum of the components (e.g., $F_r+f$ and $F_r-f$) associated with a frequency f associated with the voltage source 116 may be proportional to a determined modulation depth and the modulation depth may be proportional to the AC voltage associated with the voltage source 116. Said differently, if the source voltage associated with the voltage source 116 includes only a DC voltage, the FFT will only produce the first component set, because the frequency of the voltage produced by the current to voltage converter will be the resonator frequency $F_r$. Alternatively, if the source voltage associated with the voltage source 116 includes only an AC voltage or both a DC voltage and an AC voltage, the FFT will produce both the first component set and the second component set, because the frequency of the voltage produced by the current to voltage converter 106 will be based on the resonator frequency $F_r$ and the frequency (f) of the AC voltage associated with the voltage source 116.

In some embodiments, the non-contact voltage detector 100 may include an alarm 112. In some embodiments, the controller 110 may be configured to trigger the alarm 112 when the controller 110 receives the digital signal from the ADC 108. For example, if the source voltage associated with the voltage source 116 is greater than the sensitivity of the non-contact voltage detector 100 such that the controller 110 receives the digital signal from the ADC 108, the controller 110 may trigger the alarm 112.

In some embodiments, the controller 110 may be configured to trigger the alarm 112 when the controller 110 measures a DC voltage associated with the voltage source 116 that is greater than a DC voltage threshold. For example, if the controller 110 determines that a 240V DC voltage is associated with the voltage source 116 and the DC voltage threshold is 200V, the controller may trigger the alarm 112. In some embodiments, the controller 110 may be configured to trigger the alarm 112 when the controller 110 measures an AC voltage associated with the voltage source 116 that is greater than an AC voltage threshold. For example, if the controller 110 determines that a 240V AC voltage is associated with the voltage source 116 and the AC voltage threshold is 200V, the controller may trigger the alarm 112. In some embodiments, the controller 110 may be configured to trigger the alarm 112 when the controller 110 measures a DC voltage associated with the voltage source 116 that is greater than the DC voltage threshold and an AC voltage associated with the voltage source 116 that is greater than the AC voltage threshold. For example, if the controller 110 determines that a 240V DC voltage and a 240V AC voltage is associated with the voltage source 116 and the DC voltage threshold is 200V and the AC voltage threshold is 200V, the controller may trigger the alarm 112.

In some embodiments, the alarm 112 may include one or more lights, sirens, and/or speakers. The alarm 112 may be configured to alert a user of the non-contact voltage detector 100 when the controller 110 triggers the alarm 112. For example, when the controller 110 triggers the alarm 112, the alarm 112 may be configured to turn on or off one or more lights, sound a siren, and/or make an announcement.

Figure 3:
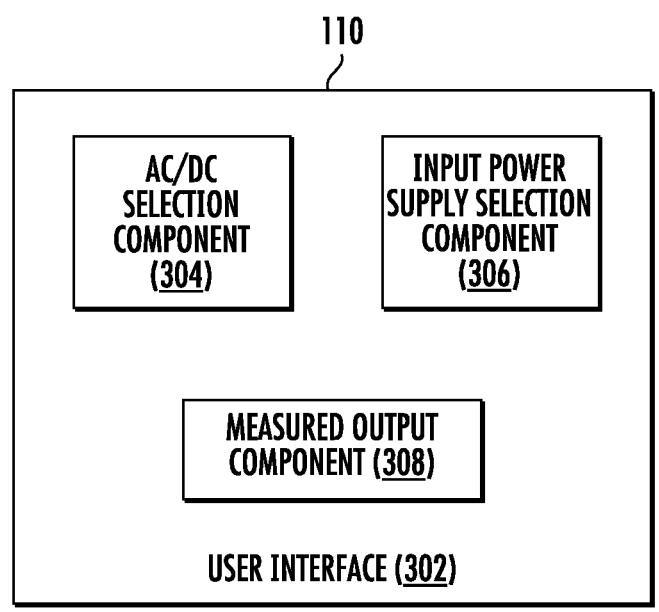
FIG. 3 illustrates an example user interface of a controller of the non-contact voltage detector in accordance with one or more embodiments of the present disclosure.

With reference to FIG. 3, in some embodiments, the controller 110 may include a user interface 302. In some embodiments, the user interface 302 may include an AC/DC selection component 304. The AC/DC selection component 304 may be used to configure the non-contact voltage detector 100 to measure for an AC voltage associated with the voltage source 116, a DC voltage associated with the voltage source 116, or both an AC voltage and a DC voltage associated with the voltage source 116. For example, a user of the non-contact voltage detector 100 may be able to use the AC/DC selection component 304 of the user interface 302 to configure the non-contact voltage detector 100 to measure for a DC voltage associated with the voltage source 116.

In some embodiments, the user interface 302 may include an input power supply selection component 306. The input power supply selection component 306 may be used to configure the non-contact voltage detector 100 to be use one or more different power supplies. For example, a user of the non-contact voltage detector 100 may use the input power supply selection component 306 of the user interface 302 to configure the non-contact voltage detector 100 to be used with a 50 Hertz (Hz), a 60 Hz, or any other power supply.

In this regard, for example, the non-contact voltage detector 100 can be readily configured to be used with multiple different power supplies, such as different power supplies that are used in different countries.

In some embodiments, the user interface 302 may include a measured output component 308. The measured output component 308 may be configured to display whether the source voltage associated with the voltage source 116 includes a DC voltage, an AC voltage, or both a DC voltage and an AC voltage. In this regard, for example, the measured output component 308 may display text, symbols, graphs, and/or colors indicating that the source voltage associated with the voltage source 116 includes a DC voltage, an AC voltage, or both a DC voltage and an AC voltage.

In some embodiments, the measured output component 308 may be configured to display the source voltage associated with the voltage source 116 determined (e.g., measured) by the controller 110. For example, the measured output component 308 may be configured to display a DC voltage associated with the voltage source 116 determined by the controller 110. In this regard, for example, the measured output component 308 may display text, symbols, graphs, and/or colors indicating that the voltage source 116 includes a DC voltage of 120V. As another example, the measured output component 308 may be configured to display an AC voltage associated with the voltage source 116 determined by the controller 110. In this regard, for example, the measured output component 308 may display text, symbols, graphs, and/or colors indicating that the voltage source 116 includes an AC voltage of 120V. As another example, the measured output component 308 may be configured to display both a DC voltage and AC voltage associated with the voltage source 116 determined by the controller 110. In this regard, for example, the measured output component 308 may display text, symbols, graphs, and/or colors indicating that the voltage source 116 includes a DC voltage of 120V and an AC voltage of 240V.

In some embodiments, the measured output component 308 may be configured to display the frequency f of an AC voltage associated with the voltage source 116 determined by the controller 110. In this regard, for example, the measured output component 308 may display text, symbols, graphs, and/or colors indicating that the voltage source 116 includes an AC voltage having a frequency f of 60 Hz.

In some embodiments, the non-contact voltage detector 100 may include an electronic driver 114. The electronic driver 114 may be configured to cause the fixed frequency resonator 102 to operate at the resonator frequency $F_r$. The electronic driver 114 may be any electronic circuit capable of causing the fixed frequency resonator 102 to operate at the resonator frequency $F_r$. Although in the non-contact voltage detector 100 depicted in FIG. 1 the electronic driver 114 is depicted as a separate component of the non-contact voltage detector 100, it would be understood by one skilled in the field to which this disclosure pertains, that, in some embodiments, the electronic driver 114 may be embodied within the fixed frequency resonator 102 and/or the controller 110.

Example Method of Non-Contact Voltage Detection

Figure 4:
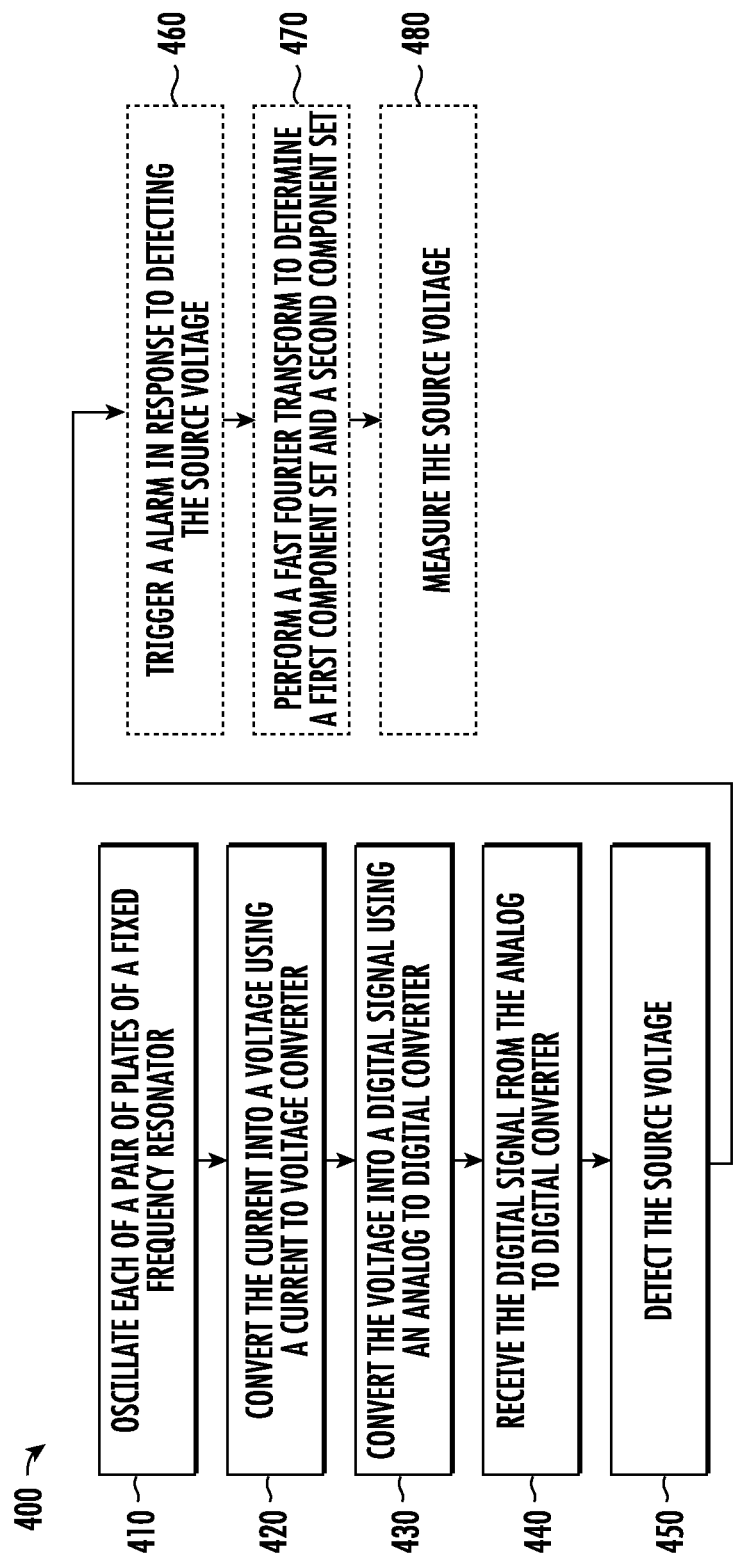
FIG. 4 illustrates a flowchart of an example method of non-contact voltage detection in accordance with one or more embodiments of the present disclosure.

Referring now to FIG. 4, a flowchart providing an example method 400 for non-contact voltage detection is illustrated. In this regard, FIG. 4 illustrates operations that may be performed by the non-contact voltage detector 100 and/or components of the non-contact voltage detector 100. For example, in some embodiments, the operations illustrated in FIG. 4 may, for example, be performed by, with the assistance of, and/or under the control of the controller 110 (e.g., processing circuitry 502, memory 504, processor 506, user interface 508, and/or communication interface 510), the fixed frequency resonator 102, the sensor plate 104, the current to voltage converter 106, the ADC 108, the alarm 112, and/or the electronic driver 114.

As shown in block 410, the method may include oscillating each of a pair of plates of a fixed frequency resonator. In this regard, the fixed frequency resonator may be proximate a sensor plate. In this regard, in the presence of the source voltage associated with the voltage source a current is induced in the sensor plate. As described above, the sensor plate may be positioned proximate the source voltage associated with the voltage source when the non-contact voltage detector is being used to detect the source voltage associated with a voltage source and/or measure the source voltage associated with the voltage source. In this regard, the source voltage associated with the voltage source and the sensor plate may be at least partially separated by an insulator (e.g., ambient air). Accordingly, when the non-contact voltage detector is being used to detect the source voltage associated with a voltage source and/or measure the source voltage associated with the voltage source, a capacitor is formed by the source voltage associated with the voltage source and the sensor plate.

As described above, the fixed frequency resonator may be proximate the sensor plate and, when the non-contact voltage detector is being used to detect the source voltage associated with a voltage source and/or measure the source voltage associated with the voltage source, proximate the source voltage associated with the voltage source (e.g., between the source voltage associated with the voltage source and the sensor plate there may be an insulator (e.g., ambient air) and/or the fixed frequency resonator).

As described above, the fixed frequency resonator may include a pair of plates. In some embodiments, the pair of plates may be configured to oscillate. In some embodiments, as the pair of plates oscillate and the distance R between the pair of plates varies, the fixed frequency resonator may cause the capacitance of the capacitor formed by the source voltage associated with the voltage source and the sensor plate to vary. For example, as the distance R between the pair of plates increases, the capacitance of the capacitor formed by the source voltage associated with the voltage source and the sensor plate may increase, while as the distance between the pair of plates decreases, the capacitance of the capacitor formed by the source voltage associated with the voltage source and the sensor plate may decrease. In some embodiments, when the non-contact voltage detector is in the presence of the source voltage associated with the voltage source (e.g., when the fixed frequency resonator and/or the sensor plate are proximate the voltage source) a current may be induced in the sensor plate. In some embodiments, the source voltage associated with the voltage source may induce the current in the sensor plate. In some embodiments, the greater the source voltage associated with the voltage source, the greater the current that will be induced in the sensor plate. The current induced in the sensor plate may be an AC current. In this regard, the current induced in the sensor plate may be an AC current if the source voltage associated with the voltage source includes a DC voltage, an AC voltage, or both a DC voltage and an AC voltage.

As shown in block 420, the method may include converting the current into a voltage using a current to voltage converter. As described above, a current to voltage converter may be configured to convert the current induced in the sensor plate into a voltage. In some embodiments, the voltage may be an AC voltage.

As shown in block 430, the method may include converting the voltage into a digital signal using an analog to digital converter (ADC). As described above, in some embodiments, an ADC may be configured to convert the voltage into a digital signal. As described above, although the ADC may be a separate component of the non-contact voltage detector, it would be understood by one skilled in the field to which this disclosure pertains, that, in some embodiments, the ADC may be embodied within the controller.

As shown in block 440, the method may include receiving the digital signal from the analog to digital converter.

As shown in block 450, the method may include detecting the source voltage. As described above, the controller may be configured to detect the source voltage associated with the voltage source by receiving the digital signal from the ADC. That is, if the controller receives the digital signal from the ADC, the controller detects the source voltage associated with the voltage source. Said differently, because the sensitivity of the non-contact voltage detector may be set such that, if the source voltage associated with the voltage source is less than the sensitivity of the non-contact voltage detector, no current will be induced in the sensor plate and, as a result, the controller will not receive the digital signal from the ADC (e.g., via the current to voltage converter). Similarly, because the sensitivity of the non-contact voltage detector may be set such that, if the source voltage associated with the voltage source is equal to or greater than the sensitivity of the non-contact voltage detector, the current will be induced in the sensor plate and, as a result, the controller will receive the digital signal from the ADC (e.g., via the current to voltage converter).

As shown in optional block 460, the method may optionally include triggering an alarm in response to detecting the source voltage. As described above, the controller may be configured to trigger the alarm when the controller receives the digital signal from the ADC. For example, if the source voltage associated with the voltage source is greater than the sensitivity of the non-contact voltage detector such that the controller receives the digital signal from the ADC, the controller may trigger the alarm.

As shown in optional block 470, the method may optionally include performing a Fast Fourier Transform to determine a first component set and a second component set. In this regard, the first component set and the second component set may include components in the frequency domain. In some embodiments, the first component set may include a component associated with the resonator frequency $F_r$ associated with the fixed frequency resonator. In some embodiments, the second component set may include a component associated with the resonator frequency $F_r$ associated with the fixed frequency resonator and components (e.g., $F_r+f$ and $F_r-f$) associated with a frequency f associated with the voltage source (e.g., the frequency of an AC voltage associated with the voltage source).

As shown in optional block 480, the method may optionally include measuring the source voltage. As described above, the controller may be configured to measure the source voltage associated with the voltage source based on the digital signal received from the ADC. For example, the controller may be able to measure a DC voltage associated with the voltage source, an AC voltage the voltage source, and/or a DC and an AC voltage the voltage source. In some embodiments, the controller may be configured to determine (e.g., measure) a DC voltage associated with the voltage source based on the component associated with the resonator frequency $F_r$ associated with the fixed frequency resonator. For example, the controller may be configured to determine the amplitude of the DC voltage associated with the voltage source using the component associated with the resonator frequency $F_r$ associated with the fixed frequency resonator. In some embodiments, the controller may be configured to determine (e.g., measure) an AC voltage associated with the voltage source based on the components (e.g., $F_r$+f and $F_r$—f) associated with a frequency f associated with the voltage source. For example, the controller may be configured to determine (e.g., measure) an AC voltage associated with the voltage source because the sum of the components (e.g., $F_r$+f and $F_r$—f) associated with a frequency f associated with the voltage source may be proportional to the modulation depth and the modulation depth may be proportional to the AC voltage associated with the voltage source. Said differently, if the source voltage associated with the voltage source includes only a DC voltage, the FFT will only produce the first component set, because the frequency of the voltage produced by the current to voltage converter will be the resonator frequency $F_r$. Alternatively, if the source voltage associated with the voltage source includes only an AC voltage or both a DC voltage and an AC voltage, the FFT will produce both the first component set and the second component set, because the frequency of the voltage produced by the current to voltage converter will be based on the resonator frequency $F_r$ and the frequency (f) of the AC voltage associated with the voltage source.

As described above, in some embodiments, the controller may be configured to trigger the alarm when the controller measures a DC voltage associated with the voltage source that is greater than a DC voltage threshold. In some embodiments, the controller may be configured to trigger the alarm when the controller measures an AC voltage associated with the voltage source that is greater than an AC voltage threshold. In some embodiments, the controller may be configured to trigger the alarm when the controller measures a DC voltage associated with the voltage source that is greater than the DC voltage threshold and an AC voltage associated with the voltage source that is greater than the AC voltage threshold.

Example Computer Processing Device

Figure 5:
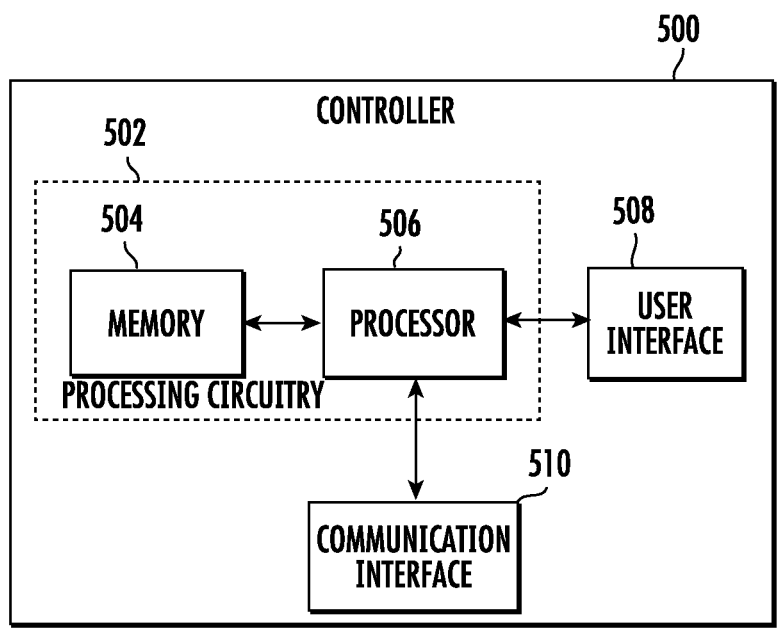
FIG. 5 illustrates a block diagram of an example computer processing device in accordance with one or more embodiments of the present disclosure.

With reference to FIG. 5, a block diagram of an example computer processing device 500 is illustrated in accordance with some example embodiments. In some embodiments, the controller 110 may be embodied as one or more computer processing devices, such as the computer processing device 500 in FIG. 5. However, it should be noted that the components, devices, or elements illustrated in and described with respect to FIG. 5 below may not be mandatory and thus one or more may be omitted in certain embodiments. Additionally, some embodiments may include further or different components, devices or elements beyond those illustrated in and described with respect to FIG. 5.

The computer processing device 500 may include or otherwise be in communication with processing circuitry 502 that is configurable to perform actions in accordance with one or more embodiments disclosed herein. In this regard, the processing circuitry 502 may be configured to perform and/or control performance of one or more functionalities of the computer processing device 500 in accordance with various embodiments, and thus may provide means for performing functionalities of the computer processing device 500 in accordance with various embodiments. The processing circuitry 502 may be configured to perform data processing, application execution and/or other processing and management services according to one or more embodiments. In some embodiments, the computer processing device 500 or a portion(s) or component(s) thereof, such as the processing circuitry 502, may be embodied as or comprise a chip or chip set. In other words, the computer processing device 500 or the processing circuitry 502 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The computer processing device 500 or the processing circuitry 502 may therefore, in some cases, be configured to implement an embodiment of the disclosure on a single chip or as a single "system on a chip." As such, in some cases, a chip or chipset may constitute means for performing one or more operations for providing the functionalities described herein.

In some embodiments, the processing circuitry 502 may include a processor 506 and, in some embodiments, such as that illustrated in FIG. 5, may further include memory 504. The processing circuitry 502 may be in communication with or otherwise control a user interface 508 and/or a communication interface 510. As such, the processing circuitry 502 may be embodied as a circuit chip (e.g., an integrated circuit chip) configured (e.g., with hardware, software or a combination of hardware and software) to perform operations described herein.

The processor 506 may be embodied in a number of different ways. For example, the processor 506 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 506 may comprise a plurality of processors. The plurality of processors may be in operative communication with each other and may be collectively configured to perform one or more functionalities of the computer processing device 500 as described herein. In some embodiments, the processor 506 may be configured to execute instructions stored in the memory 504 or otherwise accessible to the processor 506. As such, whether configured by hardware or by a combination of hardware and software, the processor 506 may represent an entity (e.g., physically embodied in circuitry—in the form of processing circuitry 502) capable of performing operations according to embodiments of the present disclosure while configured accordingly. Thus, for example, when the processor 506 is embodied as an ASIC, FPGA or the like, the processor 506 may be specifically configured hardware for conducting the operations described herein. Alternatively, as another example, when the processor 506 is embodied as an executor of software instructions, the instructions may specifically configure the processor 506 to perform one or more operations described herein.

In some embodiments, the memory 504 may include one or more non-transitory memory devices such as, for example, volatile and/or non-volatile memory that may be either fixed or removable. In this regard, the memory 504 may comprise a non-transitory computer-readable storage medium. It will be appreciated that while the memory 504 is illustrated as a single memory, the memory 504 may comprise a plurality of memories. The memory 504 may be configured to store information, data, applications, instructions and/or the like for enabling the computer processing device 500 to carry out various functions in accordance with one or more embodiments. For example, the memory 504 may be configured to buffer input data for processing by the processor 506. Additionally or alternatively, the memory 504 may be configured to store instructions for execution by the processor 506. As yet another alternative, the memory 504 may include one or more databases that may store a variety of files, contents or data sets. Among the contents of the memory 504, applications may be stored for execution by the processor 506 in order to carry out the functionality associated with each respective application. In some cases, the memory 504 may be in communication with one or more of the processor 506, user interface 508, and/or communication interface 510 via a bus(es) for passing information among components of the computer processing device 500.

The user interface 508 may be in communication with the processing circuitry 502 to receive an indication of a user input at the user interface 508 and/or to provide an audible, visual, mechanical or other output to the user. As such, the user interface 508 may include, for example, a keyboard, a mouse, a joystick, a display, a touch screen display, a microphone, a speaker, and/or other input/output mechanisms. As such, the user interface 508 may, in some embodiments, provide means for a user to access and interact with the controller 110.

The communication interface 510 may include one or more interface mechanisms for enabling communication with other devices and/or networks. In some cases, the communication interface 510 may be any means such as a device or circuitry embodied in either hardware, or a combination of hardware and software that is configured to receive and/or transmit data from/to a network and/or any other device or module in communication with the processing circuitry 502. By way of example, the communication interface 510 may be configured to enable the controller 110 to communicate with the fixed frequency resonator 102, the sensor plate 104, the current to voltage converter 106, the analog to digital converter 108, the alarm 112, the electronic driver 114, and/or other controllers/computing devices. Accordingly, the communication interface 510 may, for example, include an antenna (or multiple antennas) and supporting hardware and/or software for enabling communications with a wireless communication network (e.g., a wireless local area network, cellular network, global positing system network, and/or the like) and/or a communication modem or other hardware/software for supporting communication via cable, digital subscriber line (DSL), universal serial bus (USB), Ethernet or other methods.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

That which is claimed:

1. A non-contact voltage detector configured to detect a source voltage associated with a voltage source, the non-contact voltage detector comprising:
    a sensor plate comprising an electrically conductive material;
    a fixed frequency resonator proximate the voltage source and being disposed between the voltage source and the sensor plate, the fixed frequency oscillator comprising a pair of plates each configured to oscillate, wherein, in the presence of the source voltage associated with the voltage source proximate to the fixed frequency resonator, the fixed frequency resonator is configured to modulate capacitance associated with a capacitor formed by the source voltage and the sensor plate to induce a current in the sensor plate;
    a current to voltage converter connected with the sensor plate and configured to convert the current induced in the sensor plate into a voltage;
    an analog to digital converter connected with the current to voltage converter configured to convert the voltage into a digital signal; and
    a controller connected with the analog to digital converter and configured to receive the digital signal from the analog to digital converter and, in response to receiving the digital signal from the analog to digital converter, detect the source voltage.

2. The non-contact voltage detector of claim 1, wherein, in response to the controller detecting the source voltage, the controller is configured to trigger an alarm.

3. The non-contact voltage detector of claim 1, wherein the controller detects the source voltage when the source voltage is greater than a sensitivity.

4. The non-contact voltage detector of claim 3, wherein the sensor plate and the fixed frequency resonator are separated by a first distance.

5. The non-contact voltage detector of claim 4, wherein the sensitivity is inversely proportional to the first distance.

6. The non-contact voltage detector of claim 1, wherein the fixed frequency resonator is associated with a resonator frequency and wherein each of the pair of plates are configured to oscillate at the resonator frequency.

7. The non-contact voltage detector of claim 1, wherein the source voltage comprises DC voltage.

8. The non-contact voltage detector of claim 1, wherein the source voltage comprises DC voltage and AC voltage.

9. The non-contact voltage detector of claim 8, wherein the controller is further configured to perform a Fast Fourier Transform to determine a first component set and a second component set.

10. The non-contact voltage detector of claim 1, wherein the pair of plates are configured to oscillate between a first position in which the pair of plates contact each other and a second position in which the pair of plates are separated by a second distance.

11. A non-contact voltage detection method configured to detect a source voltage associated with a voltage source, the non-contact voltage detection method comprising:
   oscillating each of a pair of plates of a fixed frequency resonator, wherein the fixed frequency resonator is proximate the voltage source and is disposed between the voltage source and a sensor plate, and wherein in the presence of the source voltage proximate to the fixed frequency resonator, the fixed frequency resonator is configured to modulate capacitance associated with a capacitor formed by the source voltage and the sensor plate to induce a current is induced in the sensor plate;
   converting the current into a voltage using a current to voltage converter;
   converting the voltage into a digital signal using an analog to digital converter;
   receiving the digital signal from the analog to digital converter; and
   detecting the source voltage.

12. The non-contact voltage detection method of claim 11, further comprising:
   triggering an alarm in response to detecting the source voltage.

13. The non-contact voltage detection method of claim 11, wherein the source voltage is detected when the source voltage is greater than a sensitivity.

14. The non-contact voltage detection method of claim 13, wherein the sensor plate and the fixed frequency resonator are separated by a first distance.

15. The non-contact voltage detection method of claim 14, wherein the sensitivity is inversely proportional to the first distance.

16. The non-contact voltage detection method of claim 11, wherein the fixed frequency resonator is associated with a resonator frequency and wherein each of the pair of plates are configured to oscillate at the resonator frequency.

17. The non-contact voltage detection method of claim 11, wherein the source voltage comprises DC voltage.

18. The non-contact voltage detection method of claim 11, wherein the source voltage comprises DC voltage and AC voltage.

19. The non-contact voltage detection method of claim 18, further comprising:
   performing a Fast Fourier Transform to determine a first component set and a second component set.

20. The non-contact voltage detection method of claim 11, wherein the pair of plates are configured to oscillate between a first position in which the pair of plates contact each other and a second position in which the pair of plates are separated by a second distance.

* * * * *